United States Patent
Yablonovitch

(10) Patent No.: US 6,373,207 B1
(45) Date of Patent: Apr. 16, 2002

(54) BRAKING SYSTEM FOR A DC MOTOR

(75) Inventor: Max Yablonovitch, Dollard-des-Ormeaux (CA)

(73) Assignee: Kalish Inc., Kirkland (CA)

( * ) Notice: Subject to any disclaimer, the term of this patent is extended or adjusted under 35 U.S.C. 154(b) by 0 days.

(21) Appl. No.: 09/613,609

(22) Filed: Jul. 11, 2000

(51) Int. Cl.⁷ .............................................. H02P 3/00
(52) U.S. Cl. .................... 318/362; 318/756; 388/932
(58) Field of Search ................... 318/757, 760, 318/798, 799, 782, 786, 362, 366, 369, 374, 375, 376; 388/932

(56) References Cited

U.S. PATENT DOCUMENTS

| | | | |
|---|---|---|---|
| 3,660,738 A | * 5/1972 | Anderson et al. .......... 318/138 |
| 3,732,475 A | * 5/1973 | Geerling .................... 318/275 |
| 3,878,447 A | 4/1975 | MacDonald ................ 318/375 |
| 3,944,899 A | 3/1976 | Wright ........................ 318/269 |
| 4,173,732 A | 11/1979 | Anderson ................... 318/375 |
| 4,191,914 A | * 3/1980 | Lecluse ...................... 318/139 |
| 4,216,420 A | * 8/1980 | Jinbo et al. ................. 318/370 |
| 4,235,309 A | 11/1980 | Kuhl ......................... 187/29 R |
| 4,271,383 A | 6/1981 | Endo .......................... 318/375 |
| 4,278,921 A | 7/1981 | Medding et al. ............ 318/254 |
| 4,330,742 A | * 5/1982 | Reimers ...................... 320/14 |
| 4,423,363 A | 12/1983 | Clark et al. ................. 318/375 |
| 4,529,919 A | 7/1985 | Melocik et al. ............. 318/373 |
| 4,633,154 A | * 12/1986 | Maeda ........................ 318/373 |
| 4,922,161 A | 5/1990 | Gilliland et al. ............ 318/269 |
| 5,151,637 A | 9/1992 | Takada et al. .............. 318/376 |
| 5,241,255 A | 8/1993 | Oshima et al. ............. 318/801 |
| 5,291,106 A | 3/1994 | Murty et al. ................ 318/375 |
| 5,350,985 A | 9/1994 | Konrad et al. ............. 318/370 |
| 5,350,988 A | 9/1994 | Le ............................. 318/618 |
| 5,420,491 A | 5/1995 | Kanzaki et al. ............. 318/727 |
| 5,705,903 A | 1/1998 | Hastings .................... 318/370 |
| 5,793,175 A | 8/1998 | Journey ..................... 318/493 |
| 5,861,724 A | * 1/1999 | Ackerson ................... 318/376 |
| 6,075,331 A | * 6/2000 | Ando et al. ................ 318/376 |
| 6,078,156 A | * 6/2000 | Spurr ......................... 318/368 |

* cited by examiner

Primary Examiner—Jeffrey Donels
Assistant Examiner—Rina I. Duda
(74) Attorney, Agent, or Firm—Clark & Elbing LLP

(57) ABSTRACT

The present invention relates to a braking system for a DC motor. The braking system includes a current control element placed across the terminals of the DC motor to regulate the magnitude of the electric current generated by the motor when the motor is in a braking mode of operation. In the most preferred embodiment, the current control element includes a semiconductor switch, such as a transistor, that is repeatedly pulsed on and off to act as a controlled short circuit across the armature of the motor. The rotational energy is dissipated as heat by the inherent resistance of the motor windings that may be augmented by an external resistor, if desired. Another possibility is to use a current control element that includes a variable load designed to dissipate the rotational energy in the form of heat. The impedance of the load element is gradually reduced as the speed of the motor is reduced to maintain the rate of energy dissipation near the peak allowable value for the structure of the DC motor. This feature permits to reduce the speed of the motor very rapidly.

35 Claims, 5 Drawing Sheets

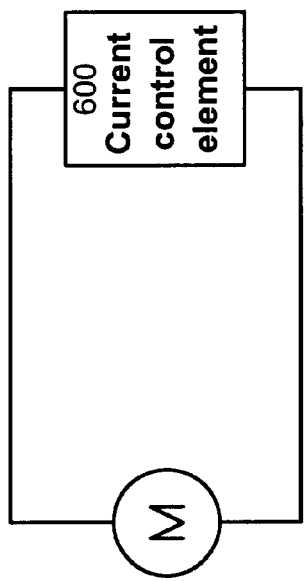
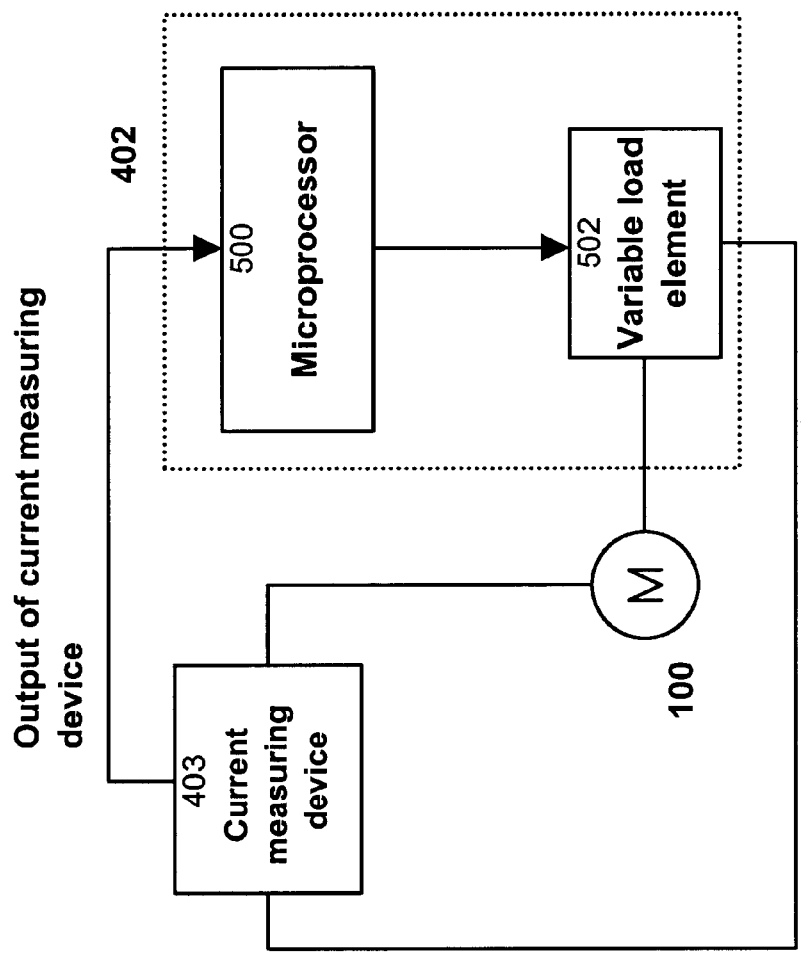
Figure 6
Figure 5

BRAKING SYSTEM FOR A DC MOTOR

FIELD OF THE INVENTION

The present invention relates to a braking system for braking an electric DC motor.

BACKGROUND OF THE INVENTION

Industrial machines that use moving parts are often provided with DC motors to impart movement to those parts. The DC motors are well suited for these applications because their torque and speed of rotation can be easily controlled. In turn, this enables to precisely control the rate of movement and the positioning of the moving part.

Once a moving part has been set in motion by a DC motor, that is usually effected through any suitable transmission system, the part must at some point be immobilised. This is usually the case of actuators designed to pick-up a component and deposit the component in a precise location. In fact, in many applications the ability to terminate the movement of the part repeatably is an important design consideration that determines the overall performance of the machine.

Several possible approaches to terminate the movement of a part or component driven by a DC motor exist. One approach relies on mechanical braking systems that dissipate the kinetic energy through friction between two contact surfaces. This strategy enables to very quickly decelerate the moving part, however, the braking system that can accomplish this task is complex and often not practical. Another approach is to control the DC motor so the latter decelerates the moving part through dynamic braking. In essence, when the movement of the part is to be terminated and power to the motor armature has been removed, a load is placed across the terminals of the DC motor. The former then ceases to act as a driving source and becomes a generator driven by the inertia of the part in motion. The electric current generated by the motor is dissipated in the load in the form of heat. This approach is widely used because the control mechanism for switching the motor from the driving mode to the braking mode is easy to implement. Indeed, it suffices to provide a suitable mechanism that will switch across the terminals of the motor, when braking is desired, a load to dissipate the energy.

To obtain a high rate of energy dissipation that is necessary to quickly stop the motor, the load across the terminals of the motor should be as high as possible. A high load (low impedance) is likely to generate high current though the winding of the DC motor that in turn can damage the permanent magnets of the motor because such high current can exceed demagnetisation levels. In practice, manufacturers of DC motors specify a peak current value that the motor can sustain without causing any damage to the magnets of the motor. Any braking system using this motor is thus designed not to exceed the peak current value, otherwise the motor can be damaged.

When a DC motor is operating in the dynamic braking mode, the current generated by the motor that is passing through the load reaches its peak value as soon as the braking mode is entered because at this point the rotary speed of the shaft is highest. As soon as the braking takes effect, however, the current progressively diminishes. The same relationship holds true with the rate of energy dissipation. The bulk of the energy is dissipated at the front end of the dynamic braking cycle, while less energy is dissipated near the end of the cycle. This observation highlights a fundamental deficiency in existing dynamic braking systems, where the average rate of energy dissipation during the braking cycle is relatively low, and cannot be increased to avoid exceeding the peak current limitation that occurs only during a small fraction of the cycle.

SUMMARY OF THE INVENTION

Under a first broad aspect, the present invention provides a braking system for a DC motor that is characterized by a maximum braking current value and that features first and second terminals. The braking system comprises a power supply that is capable of drawing electrical energy from the two terminals when the braking system is connected across these same terminals. A current control element receives electrical power for operation from the power supply. This current control element is capable of regulating the magnitude of a current passing through the windings of the DC motor when the braking system is connected across the first and second terminals, such that an average current passing through the windings of the DC motor during a braking cycle of the DC motor tracks the maximum braking current value over a major portion of the braking cycle.

The present inventor has made the unexpected discovery that the repeatability of movement of a DC motor can be significantly improved by dynamically braking the motor aggressively in order to reduce the unpowered coasting stroke. The unpowered coasting stroke has been found to be a source of repeatability error because of the duration of the coasting motion. During a long coasting motion, the impact of uncontrollable system variances such as friction shaft/bearings, among others, reduces repeatability. By reducing the time the motor spends in the coasting mode, the impact of those system variances is reduced. Consequently, the repeatability of movement is improved.

In a preferred embodiment, the braking system in accordance with the invention includes a current control element connected between the terminals of the DC motor to control the magnitude of the current passing in the motor windings during the braking mode of operation of the motor. The control strategy that the current control element implements is such as to allow the rate of energy dissipation during the dynamic braking cycle to be significantly increased by comparison to prior art devices, while preventing the system from exceeding the peak current value established for the motor.

In a most preferred embodiment, the system includes a current control element that can selectively acquire different operative states, namely a first operative state and a second operative state, in the first operative state the current control element manifesting a substantially lower impedance to the passage of current through the windings of the DC motor than in the second operative state. In other words, the operative states correspond to different levels of conduction; the current control element when in the second operative state allowing less current (or no current at all) to pass through the windings than in the first operative state. In a specific example, the current control element includes a semiconductor switch connected across the terminals of the DC motor. The semiconductor switch can be an N-channel MOSFET transistor which can acquire either one of the open, non-conducting condition (no current passing through it) and the closed, conducting condition (acting as a short circuit). The transistor can switch between the closed condition and the open condition, in the closed condition current being allowed to pass through it and also through the windings of the DC motor that act as energy dissipation elements by virtue of their inherent resistance.

In order to initiate the braking event, the DC motor is switched from the running mode, during which power is supplied to the motor windings, to the braking mode, during which the current control element is placed in series with the motor windings. The power supply module of the current control element quickly absorbs, filters and regulates some of the power generated by the motor, for supplying the braking circuit with sufficient power to energize the transistor with pulse width modulation (PWM) based oscillations. These oscillations remain in effect until almost the very end of the braking cycle. More specifically, throughout the braking cycle, the transistor will pulse on and off, according to a variable duty cycle. As the motor is braked, it is this duty cycle that will vary accordingly such that the average current flowing through the motor windings is maintained for as long as possible at a maximum allowable braking current value.

A control signal is provided to actuate the transistor. This control signal can be obtained from any suitable electronic device having the capability to react to a signal indicative of the current magnitude passing in the motor windings. Such signal can be obtained by placing in series with the transistor a resistor that generates an output voltage across its terminals proportional to the magnitude of the current passing through it. In a very specific example, the electronic device can be a comparator that observes the voltage drop across the resistor and compares this voltage drop to a set-point indicative of the maximum current that can be tolerated by the DC motor. The transistor acquires the open or the closed condition on the basis of a voltage signal received from the comparator. When the impressed voltage drop exceeds the set-point, indicating that the braking current flowing through the motor windings is above the safe level, the comparator causes the transistor to pulse with a duty cycle that is inversely proportional to the magnitude of the sensed braking current that is in excess of the set-point. Specifically, the smaller the magnitude of the sensed braking current that is in excess of the set-point, the larger the duty cycle. A larger duty cycle corresponds to more on time (when in the closed, conducting condition) and less off time (when in the open, non-conducting condition) for the transistor.

Thus, as the braking cycle progresses and the motor shaft speed is reduced, the on and off times of the duty cycle of the braking circuit adapt automatically to maintain an average maximum braking current through the motor windings. When the impressed voltage drop is below the set-point, indicating that the braking current flowing through the motor windings is below the safe level, the duty cycle of the transistor will become 100% (the transistor will remain on continuously with no pulsing effects) until the motor shaft speed slows to a complete stop.

In the example described above, the transistor is digitally controlled, in other words the transistor is maintained at the two extremes of its conduction range, namely the open condition or the closed condition. It is also possible to utilise an analog control scheme where the control signal causes the transistor to gradually change its level of conduction, so the current control element progressively swings back and forth between different levels of conduction, each level corresponding to a different operative state.

The current flow regulation effected by the transistor is related to the speed of rotation of the motor. When the motor speed is highest, which occurs immediately at the beginning of the dynamic braking cycle, the control effect exercised by the transistor is such as to repeatedly switch the transistor on and off according to a duty cycle that is characterized by a small on time and a large off time, such that the average current flowing through the motor windings tracks a constant maximum braking current value. This state of operation is maintained, although the duty cycle increases (more on time, less off time) as the motor speed decreases, while the speed of the motor is sufficient to generate voltage that would induce current in the electrical path of the motor windings above the safe level. However, once the speed of rotation of the motor reaches the equilibrium point, where the generated voltage would induce a current either equal to the maximal safe level or slightly below this level, the transistor becomes fully on without any pulsing effects (100% duty cycle) until the motor stops.

The braking system in accordance with the present invention is capable to terminate the rotary movement of the DC motor very rapidly while, at the same time, preventing damage to the motor. This is particularly useful because the range of applications of DC motors may now be expanded significantly and such motors can be considered to replace much more expensive servo or stepper motors. Such servo or stepper motors are normally reserved for applications where the ability to control the angular movement of the rotary shaft is critical. Those special motors are preferred over the more traditional DC motors because they have the ability to stop very quickly and generally speaking are very precise and offer excellent motion repeatability.

A DC motor provided with the braking control system in accordance with the invention now manifests a much better movement repeatability characteristics than a motor using no braking system or using a braking system constructed in accordance to prior art techniques. Repeatability of movement is an important parameter because in some applications repeatability is an acceptable alternative to precision. Repeatability means that the overall movement of the motor including the stroke under powered control and the unpowered coasting stroke are very consistent from one cycle to another. Although measurable and often substantial variations may exist with nominal stroke values, the actual movement is highly repeatable. In some industrial applications, servo or stepper type motors that are normally designed for precision of movement are the only choice not because they are precise but because they have good repeatability of movement characteristics as well. The braking system in accordance with the invention now allows DC motors to be considered for those specific applications. The obvious advantage to this novel approach is the significant cost savings resulting from the elimination of the servo or stepper type motors.

In a somewhat different embodiment, the current control element comprises a variable load whose impedance is modulated to progressively diminish as the speed of rotation of the motor is reduced. This embodiment uses a current measuring device that generates an output signal indicative of the magnitude of the current passing through the DC motor windings. The output of the current measuring device is supplied to a control module that includes two functional elements, namely a logic element and a variable load element. The logic element is preferably microprocessor based and includes an input to receive the output of the current measuring device. On the basis of the data supplied at the input, the microprocessor determines the value of the load and adjusts the load accordingly. As to the variable load element, this component may be formed of an array of resistors that can be selectively switched in parallel or series to adjust the impedance across the terminals of the DC motor. The microprocessor determines the number of resistors necessary to achieve the desired load value at any given time and issues an output signal to effectively switch on line the selected arrangement of resistors.

BRIEF DESCRIPTION OF THE DRAWINGS

FIG. 5 illustrates the structure of the variable load module of the braking system in accordance with the invention;

FIG. 6 illustrates the structure of the braking system in accordance with a preferred embodiment of the invention;

DETAILED DESCRIPTION

Figure 1:
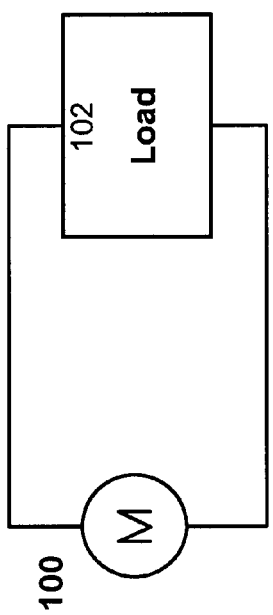
FIG. 1 illustrates a dynamic braking system for a DC motor in accordance with the prior art.
Figure 4:
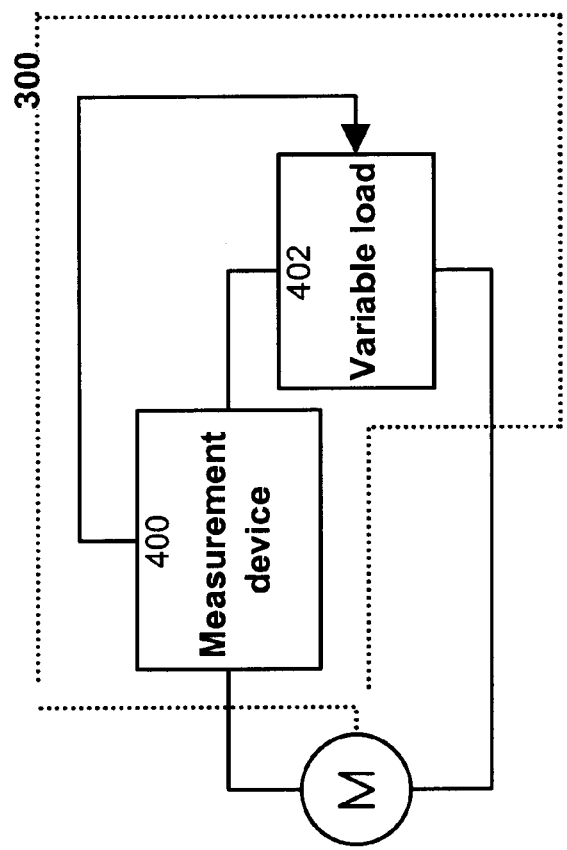
FIG. 4 illustrates the braking system of FIG. 3, with greater detail.

FIG. 1 illustrates a prior art braking system that includes a DC motor connected to a fixed value load 102. During the braking cycle, the DC motor 100 acts as a generator and forces electrical current to pass through the load 102. The load dissipates the current in form of thermal energy.

Figure 2:
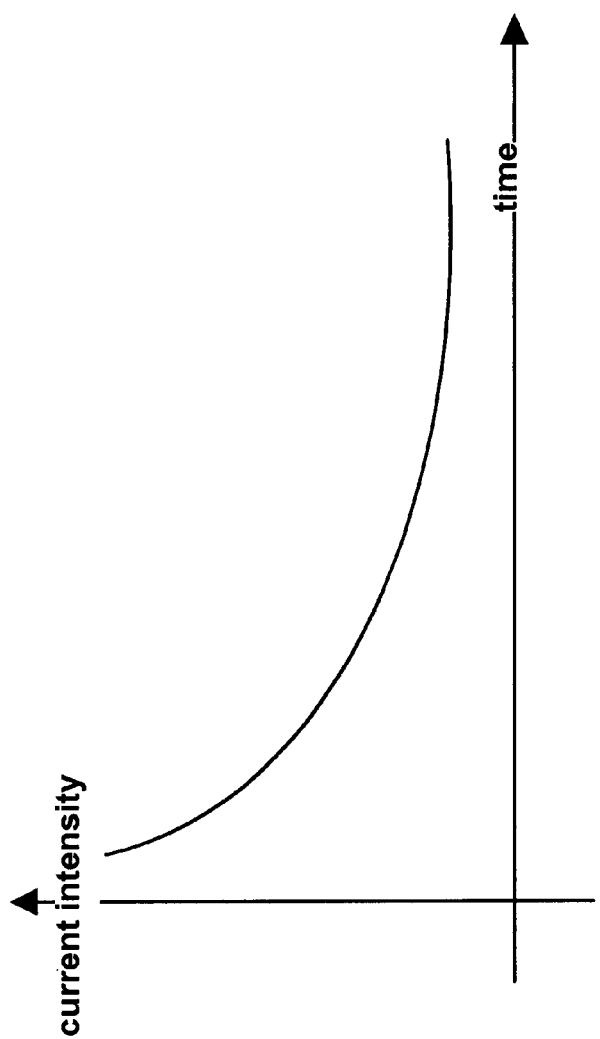
FIG. 2 is a graph showing the current intensity versus time in the braking system of FIG. 1.

The intensity of the current passing through the load 102 versus time is depicted at the graph in FIG. 2. It will be noted that the intensity of the current is maximal at the beginning of the braking event and gradually decreases as the speed of the motor diminishes. This reduces the rate of energy dissipation and undesirably extends the time necessary to completely terminate the movement of the motor.

Figure 3:
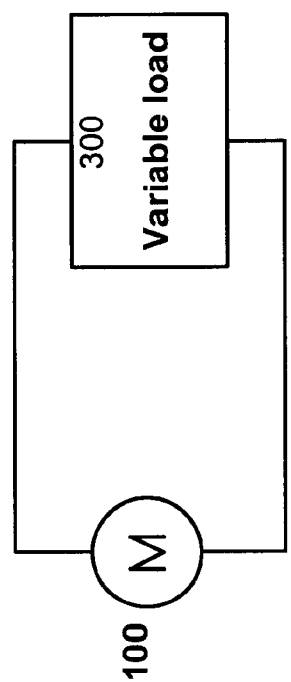
FIG. 3 illustrates a braking system in accordance with the invention.

FIG. 3 illustrates a braking system featuring a variable load 300. Such a variable load allows the impedance established across the terminals of the DC motor to be progressively reduced so as to more aggressively dissipate the energy and in turn reduce the time necessary to completely terminate the movement of the motor.

The variable load element 300 includes two main components, namely a measurement device 400 to determine or estimate the rotational speed of the motor and a variable load module 402 that creates an impedance of a selected value across the terminals of the DC motor. In a specific embodiment, depicted in FIG. 5, a current measuring device 403 of a type well known to those skilled in the art is placed in series with the load module 402. The current measuring device 403 generates an output signal indicative of the magnitude of the current passing through the load module 402. The variable load module 402 includes a microprocessor 500 that receives the output signal of the current measuring device 403 and determines on the basis of that output signal the value of the load 502 to be established across the terminals of the DC motor 100. Most preferably, the microprocessor 500 includes a memory in which is stored a table permitting to easily determine the value of the load 502.

The variable load element 502 can be formed by an array of resistors capable of being selectively switched in parallel or series to create various impedance levels. The microprocessor 500 determines at any given time the number of resistors that must be combined, and the appropriate resistor connection arrangement that must be implemented, in order to achieve the desired load value. For instance, the table of the microprocessor 500 may simply associate, for a given value of the output signal from the current measuring device 403, a corresponding number of resistors to be combined and a particular resistor connection arrangement to be implemented.

The control strategy enforced by the microprocessor 500 aims in maintaining the current passing through the load as close as possible to the permitted maximum braking current value during the entire braking cycle. This allows raising the average current magnitude during the braking cycle, thus reducing significantly the time necessary to completely stop the motor, by comparison to prior art techniques.

Most preferably, the values stored in the table of the microprocessor 500 can be calculated or obtained by experimentation so that the current will stay close to the maximal permissible value during the entire braking cycle.

Figure 7:
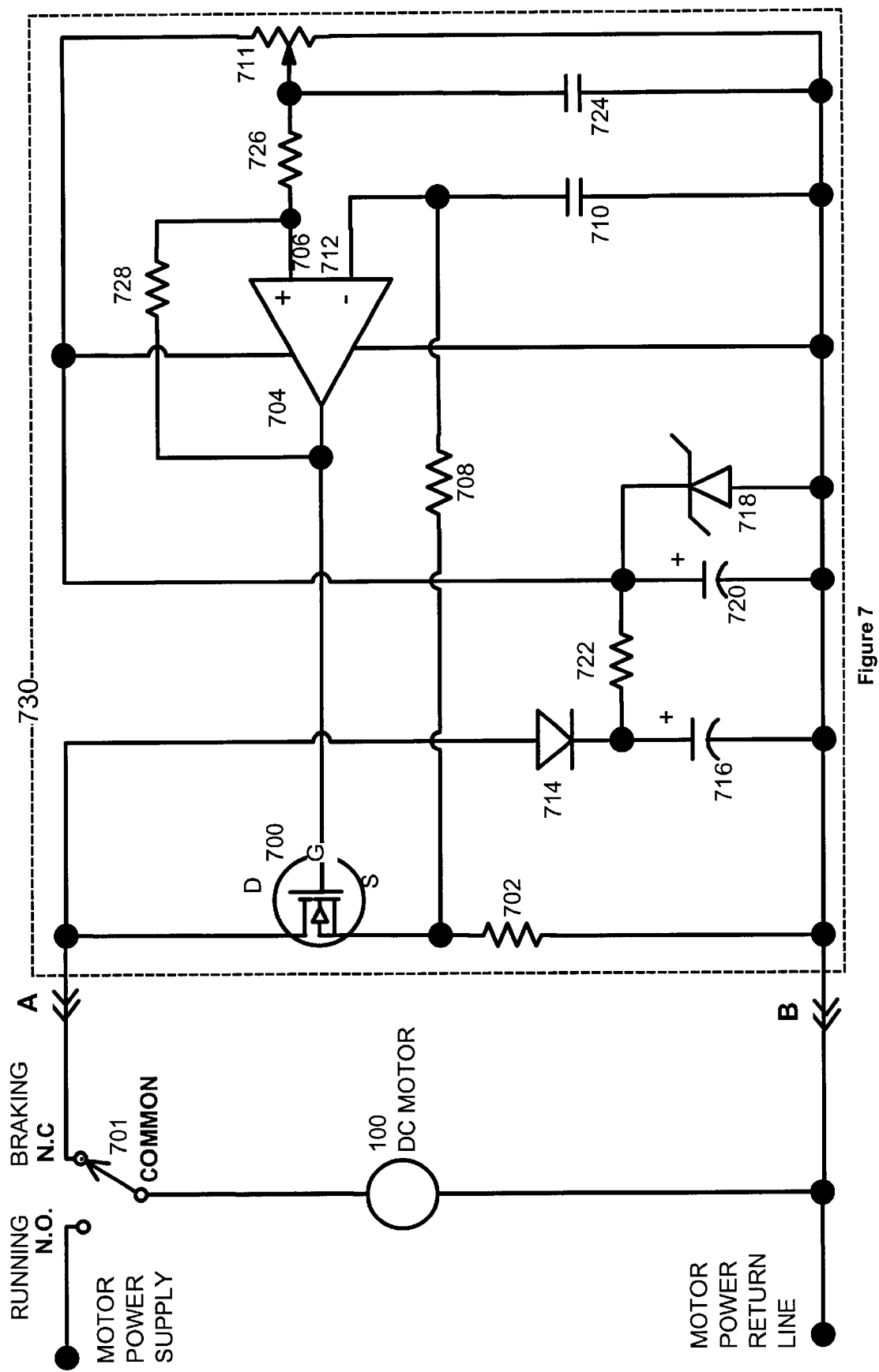
FIG. 7 is a detailed schematical diagram of the braking system in accordance with the present invention.

Another example of the implementation of the present invention is depicted in FIGS. 6 and 7. The embodiment of FIG. 6 provides a current control element 600 that regulates the magnitude of the current allowed to pass in the windings of the DC motor 100. In this specific example, the inherent resistance of the motor windings primarily effects the energy dissipation necessary to terminate the rotational movement of the motor 100. It is, however, possible to provide the current control element 600 with an additional resistor or any other suitable impedance that can absorb and dissipate thermal energy upon passage of current generated by the motor 100. Such arrangement can be used to augment the overall resistance of the electrical path defined by the motor windings and the current control element 600.

In the example of FIG. 7, the current control element 600 is a load module 730 that comprises a semiconductor switch in the form of a transistor 700 connected across the terminals of the DC motor 100. The purpose of the load module 730 is to regulate, by means of the transistor 700, the passage of current through the motor windings such that the average current passing through the motor windings over a braking cycle of the motor 100 tracks the maximum braking current value throughout a major portion of the braking cycle, thus controlling the rate of energy dissipation. By "tracks" is implied that the magnitude of the average current is substantially equal to, or slightly below, the maximum braking current value of the motor 100. The transistor 700 is controlled so as to repeatedly open and close as required. The magnitude of the electrical current passing through the transistor 700 and through the windings of the DC motor 100 is determined by observing the voltage drop occurring across a resistor 702. This resistor is of a relatively small value, its purpose being solely to provide the functionality of a current sensor.

A comparator 704 effects the pulsing of the transistor 700. This comparator includes a first input 712 that receives the output signal from the resistor 702. This signal is passed through a simple RC filter formed by a resistor 708 and a capacitor 710, the purpose being to "average out" the pulsed nature of the signal received from the resistor 702 and to reduce high frequency components, such as voltage transients that may otherwise trigger the comparator 704 to falsely react. The other input 706 of the comparator 704 receives a voltage set-point indicative of the voltage across the adjustable resistor 711 that corresponds to the maximum allowable braking current magnitude through the motor windings.

Resistor 728 provides for positive feedback around the comparator 704, while resistor 726 provides for hysteresis. In particular, resistors 726 and 728, along with the capacitor 710, combine to modulate the transistor 700, in order to ensure that the braking current magnitude through the motor windings is maintained at its maximum permissible level for as long as possible, throughout the braking cycle. More specifically, these circuit components ensure that the braking current is characterized by pulse width modulated (PWM) "chop" oscillations. The ON/OFF duty cycle of these high frequency oscillations is substantially controlled by the voltage generated across resistor 702 during the ON portion of the PWM frequency cycle and the reference voltage setting of the potentiometer 711. The net result of the controlled high frequency "chopping" of the brake current is to provide a constant average braking current for braking the DC motor 100 throughout the braking cycle, where this constant average braking current is substantially equal to the maximum allowable braking current value for the motor 100.

A power supply module includes a diode 714 that is connected to a terminal of the DC motor 100. The diode leads to a capacitor 716 and charges that capacitor 716 with the voltage produced by the motor 100 when the braking mode is initiated. In effect, the capacitor 716 is being charged when the switch 701 is in the braking mode, for establishing a high voltage reservoir. There is no voltage regulation for the capacitor 716. Rather, it is responsible for soaking up as much power as permitted by its capacity from the motor 100, the rating of capacitor 716 being such that it is able to handle the high level of expected voltage from the motor 100. The voltage level of the energy stored in the capacitor 716 may exceed the required voltage for the various electronic components of the braking circuit.

The second capacitor 720 derives its charge substantially from capacitor 716, through a current limiting resistor 722. Voltage regulation of the second capacitor 722 is effected through a Zener diode 718. The voltage clamping characteristics of the Zener diode 718 are chosen to match the voltage requirements of the other components of the braking circuit, most notably the comparator 704 and the variable resistor 711.

The two-stage power supply module, including capacitors 716 and 720, serves to maximize the useful storage of the available power generated by the motor 100 when the switch 701 is in the braking mode. More specifically, with this two-stage capacitor arrangement, power for controlling the braking circuit is substantially maintained until the end of the braking cycle, even if the instantaneous power generated by the motor 100 at the end of the braking cycle is of a magnitude insufficient to directly supply the power required by the braking circuit.

When the switch 701 is in the running mode, the diode 714 prevents the capacitors 716 and 720 from being discharged back in to the motor 100.

The arrangement described earlier is particularly useful in retrofitting existing braking resistors with the braking system in accordance with the invention. The retrofit simply requires the removal of the existing fixed resistor (that would be placed across connectors A and B shown in FIG. 7) and replacement of this fixed resistor with the load module 730 defined above. There is no need to provide any power supply, such as a battery, since the braking system parasitically derives power generated by the motor 100 when the switch 701 is in the braking mode.

The system operates as follows. To initiate the braking event, a mechanical or an electronic switch 701 is switched from the running mode, during which power is supplied to the motor windings, to the braking mode, during which the current control element (load module 730) is placed in series with the motor windings. At the beginning of the braking event, the voltage generated by the motor 100 is high, thus inducing a flow of electric current through the windings that is of significant magnitude.

The power supply module quickly absorbs, filters and regulates some of the power generated by the motor 100, for supplying the braking circuit with sufficient power to energize the PWM-based oscillations of the transistor 700. These oscillations remain in effect until almost the very end of the braking cycle. More specifically, when initially powered by the power supply module, and by virtue of the presence of resistors 726, 728 and capacitor 710, the comparator 704 will start to oscillate at some fixed frequency. As a result, the transistor 700 will pulse on and off, according to a particular duty cycle. As the motor 100 is braked, this duty cycle will vary accordingly, as will be described in further detail below.

When the braking current passes through the resistor 702, it generates a voltage drop that is filtered and averaged by the RC network formed of resistor 708 and capacitor 710, and impressed at the input 712 of the comparator 704. When the impressed voltage drop exceeds the set-point, indicating that the braking current flowing through the motor windings is above the safe level, the comparator pulses with a duty cycle that is inversely proportional to the magnitude of the sensed braking current that is in excess of the set-point. Specifically, the smaller the magnitude of the sensed braking current that is in excess of the set-point, the larger the duty cycle. A larger duty cycle corresponds to more on time (when in the closed, conducting condition) and less off time (when in the open, non-conducting condition) for the transistor 700. Thus, as the braking cycle progresses and the motor 100 shaft speed is reduced, the on and off times of the duty cycle of the braking circuit adapt automatically to maintain an average maximum braking current through the motor 100 windings.

The inherent frequency of operation remains substantially constant throughout the braking cycle of the motor 100, with only the duty cycle of the transistor 700 varying over time. When the impressed voltage drop at the input 712 of the comparator 704 is below the set-point, indicating that the braking current flowing through the motor windings is below the safe level, the duty cycle of the transistor 700 will become 100% (the transistor 700 will remain on continuously with no pulsing effects) until the motor shaft speed slows to a complete stop.

The energy dissipation occurs primarily in the motor windings due to their inherent resistance. The resistor 702 also dissipates some energy. Pulsing the transistor 700 on (closed, conducting condition) and off (open, non-conducting condition) reduces the dissipation of braking power (heating effects) in the transistor 700. Additional resistors can also be placed in series with the transistor 700 if it is desired to increase the effective resistance of the entire circuit.

Figure 8:
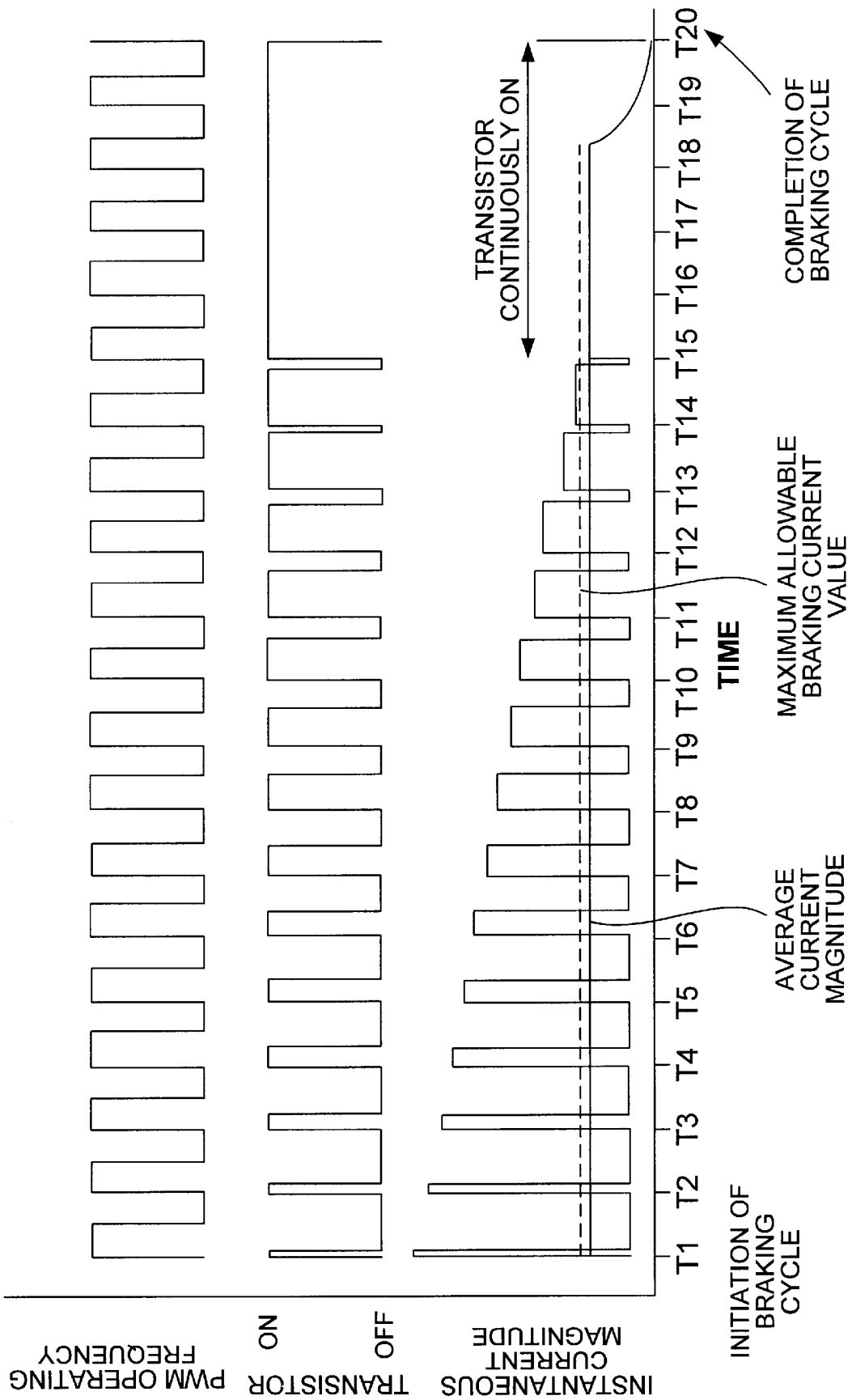
FIG. 8 is a graph illustrating the current magnitude versus time in the embodiment of the invention illustrated in FIG. 7.

The graph of FIG. 8 illustrates the instantaneous and average magnitude of the electrical current being withdrawn from the motor 100 during a complete braking cycle. At the mark T1, the switch 701 is switched from the running mode to the braking mode, such that the voltage that is normally impressed across the windings of the DC motor 100 is removed and the braking event begins. Since the rotational movement of the motor 100 is highest at this point, the voltage that the motor 100 generates will be very high and the instantaneous magnitude of the sensed braking current flowing through the motor windings will be in excess of the set-point. Accordingly, the PWM duty cycle of the transistor 700 will be very small, only a few percent of the cycle being on time and the rest off time. As time goes by, the motor shaft speed decreases such that the instantaneous magnitude of the sensed braking current decreases. Accordingly, the PWM duty cycle will become increasingly larger (more on time and less off time). The process of gradually lengthening the on time and shortening the off time continues until the braking current pulses fall below the set-point, where this event is shown at T15 in the example of FIG. 8. At this point, the duty cycle becomes 100% on time and 0% off time, the transistor 700 remaining on until the end of the braking cycle.

It is important to note that the automatically adapting PWM duty cycle of the transistor 700 allows for the average of the braking current pulses occurring during a braking cycle of the motor 100 to be effectively clamped and maintained at, or slightly below, a maximum allowable braking current value, as shown in FIG. 8.

Note that, in FIG. 8, the time period between two adjacent time marks, such as T1 and T2, is representative of the inherent PWM operating frequency determined by the components of the braking circuit.

The current control element described above also serves a purpose of maintaining the rotor of the DC motor 100 immobilized after the rotor is stopped, by providing detent torque. More specifically, any tendency of the rotor to begin rotating again will be opposed by the system that initiates the energy dissipation function as described above, triggered by the voltage that appears across the terminals of the motor resulting from movement of the rotor.

The above description of a preferred embodiment should not be interpreted in any limiting manner as refinements and variations can be made without departing from the spirit of the invention. The scope of the invention is defined in the appended claims and their equivalents.

I claim:

1. A braking system for a DC motor including first and second terminals, said braking system adapted to be connected across the first and second terminals of the DC motor when the DC motor acquires a braking mode of operation, the DC motor characterized by a maximum braking current value in the braking mode of operation, said braking system including:
a power supply capable of drawing electrical energy from the first and second terminals of the DC motor when said braking system is connected across the first and second terminals;
a current control element receiving electrical power for operation from said power supply, said current control element operative to regulate a magnitude of a current passing through the windings of the DC motor for braking the DC motor, whereby an average magnitude of the current over a braking cycle of the DC motor is substantially equal to the maximum braking current value during a major portion of the braking cycle.

2. A braking system as defined in claim 1, wherein said power supply is capable of creating a reserve of electrical energy when said braking system is connected across the first and second terminals, said power supply being operative to supply electrical power to said current control element from said reserve to allow said current control element to operate.

3. A braking system as defined in claim 2, wherein said power supply includes a charge storage device.

4. A braking system as defined in claim 3, wherein said charge storage device includes a capacitor.

5. A braking system as defined in claim 1, wherein said current control element includes a sensor capable of generating an output signal indicative of a magnitude of a current passing through the windings of the DC motor, said current control element regulating the magnitude of the current passing through the windings of the DC motor in dependence upon said output signal.

6. A braking system as defined in claim 5, wherein said current control element is capable of acquiring a first operative state and a second operative state, in said second operative state said current control element manifesting a substantially higher impedance to the passage of current through the windings of the DC motor than in said first operative sate.

7. A braking system as defined in claim 6, wherein in said first operative state said current control element permits passage of electrical current through the windings of the DC motor, in said second operative state said current control element substantially precludes passage of electrical current through the windings of the DC motor.

8. A braking system as defined in claim 7, wherein when the DC motor rotates at a speed above a certain threshold, said current control element repeatedly switches between said first and said second operative states.

9. A braking system as defined in claim 8, wherein when the DC motor rotates at a speed below said certain threshold, said current control element acquires said first operative state and maintains said first operative state until the DC motor is immobilised.

10. A braking system as defined in claim 9, wherein said current control element is characterized by a duty cycle having a substantially fixed operating frequency, during each duty cycle said current control element acquiring and maintaining said first operative state for a first time period and subsequently acquiring and maintaining said second operative state for a second time period.

11. A braking system as defined in claim 10, wherein the duration of each of said first and second time periods is variable throughout the braking cycle of the DC motor.

12. A braking system as defined in claim 11, wherein as the speed of the DC motor decreases towards said certain threshold said first time period of the duty cycle increases in duration, said second time period of the duty cycle decreasing in duration proportionally to the variation in the duration of said first time period.

13. A braking system as defined in claim 12, wherein when the DC motor rotates at a speed below said threshold, the duration of said first period is substantially equal to the period of said operating frequency, such that said current control element acquires and maintains said first operative state until the DC motor is immobilised.

14. A braking system as defined in claim 13, wherein said current control element includes a switch capable of acquiring a closed condition to cause said current control element to assume said first operative state and an open condition to cause said current control element to assume said second operative state.

15. A braking system as defined in claim 14, wherein said switch is responsive to the output signal generated by said sensor to switch between said closed and open conditions.

16. A braking system as defined in claim 15, wherein said sensor includes a resistor for connection in series with the windings of the DC motor.

17. A braking system as defined in claim 16, wherein said switch is a transistor.

18. A braking system as defined in claim 17, wherein said current control element includes a comparator having a first input and a second input, said first input receiving said output signal and said second input receiving a set-point indicative of the maximum braking current value for the DC motor, said comparator including an output in operative relationship with said transistor for generating a control signal for controlling the duty cycle of said transistor when said output signal is indicative of a current magnitude greater than the maximum braking current value indicated by said set-point.

19. A braking system as defined in claim 18, wherein said comparator generates a control signal for causing said transistor to acquire and maintain said closed condition when said output signal is indicative of a current magnitude less than the maximum braking current value indicated by said set-point.

20. A braking system as defined in claim 19, wherein said power supply is coupled to said comparator to supply electrical energy to said comparator to allow said comparator to issue the control signal at said output.

21. A braking system for a DC motor including first and second terminals, said braking system adapted to be connected across the first and second terminals of the DC motor when the DC motor acquires a braking mode of operation, said braking system including a current control element operative to regulate a magnitude of a current passing through the windings of the DC motor when said braking system is connected across the first and second terminals of the DC motor, said current control element including:
   a switch capable of selectively acquiring a first operative state and a second operative state, in said second operative state said current control element manifesting a substantially higher impedance to the passage of current through the windings of the DC motor than in said first operative state;
   a control unit in operative relationship with said switch for:
      a) causing said switch to switch repeatedly between said first and second operative states when the DC motor rotates at a speed above a certain threshold;
      b) causing said switch to acquire and maintain said first operative state when the DC motor rotates at a speed below the certain threshold.

22. A braking system as defined in claim 21, wherein in said first operative state said current control element permits passage of electrical current through the windings of the DC motor, in said second operative state said current control element substantially precludes passage of electrical current through the windings of the DC motor.

23. A braking system as defined in claim 22, wherein when the DC motor rotates at a speed below said certain threshold, said current control element acquires said first operative state and maintains said first operative state until the DC motor is immobilised.

24. A braking system as defined in claim 23, wherein said current control element includes a sensor for observing a magnitude of a current passing through the windings of the DC motor.

25. A braking system as defined in claim 24, wherein said sensor generates an output signal indicative of the magnitude of a current passing through the windings of the DC motor, said current control element regulating the magnitude of the current passing through the windings of the DC motor in dependence upon said output signal.

26. A braking system as defined in claim 25, wherein said current control element is characterized by a duty cycle having a substantially fixed operating frequency, during each duty cycle said current control element acquiring and maintaining said first operative state for a first time period and subsequently acquiring and maintaining said second operative state for a second time period.

27. A braking system as defined in claim 26, wherein the duration of each of said first and second time periods is variable throughout the braking cycle of the DC motor.

28. A braking system as defined in claim 27, wherein as the speed of the DC motor decreases towards said certain threshold said first time period of the duty cycle increases in duration, said second time period of the duty cycle decreasing in duration proportionally to the variation in the duration of said first time period.

29. A braking system as defined in claim 28, wherein when the DC motor rotates at a speed below said threshold, the duration of said first period is equal to the period of said operating frequency, such that said current control element acquires and maintains said first operative state until the DC motor is immobilised.

30. A braking system as defined in claim 29, wherein said current control element includes a switch capable of acquiring a closed condition to cause said current control element to assume said first operative state and an opened condition to cause said current control element to assume said second operative state.

31. A braking system as defined in claim 30, wherein said switch is responsive to the output signal generated by said sensor to switch between said closed and opened conditions.

32. A braking system as defined in claim 31, wherein said sensor includes a resistor for connection in series with the windings of the DC motor.

33. A braking system as defined in claim 32, wherein said switch is a transistor.

34. A braking system as defined in claim 33, wherein the DC motor is characterized by a maximum braking current value, said current control element including a comparator having a first input and a second input, said first input receiving said output signal and said second input receiving a set-point indicative of the maximum braking current value for the DC motor, said comparator including an output in operative relationship with said transistor for generating a control signal for controlling the duty cycle of said transistor when said output signal is indicative of a current magnitude greater than the maximum braking current value indicated by said set-point.

35. A braking system as defied in claim 34, wherein said comparator generates a control signal for causing said transistor to acquire and maintain said closed condition when said output signal is indicative of a current magnitude less than the maximum braking current value indicated by said set-point.

* * * * *